United States Patent
Mercier et al.

(10) Patent No.: US 9,900,509 B2
(45) Date of Patent: Feb. 20, 2018

(54) FRAME REGISTRATION FOR IMAGING SENSORS IN MOTION

(71) Applicant: BAE Systems Information And Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 349 days.

(21) Appl. No.: 14/918,118

(22) Filed: Oct. 20, 2015

(65) Prior Publication Data
US 2016/0112641 A1    Apr. 21, 2016

Related U.S. Application Data

(60) Provisional application No. 62/066,400, filed on Oct. 21, 2014.

(51) Int. Cl.
| | |
|---|---|
| *H04N 5/232* | (2006.01) |
| *G06T 5/00* | (2006.01) |
| *G06T 5/20* | (2006.01) |
| *G06T 5/50* | (2006.01) |

(52) U.S. Cl.
CPC ......... *H04N 5/23267* (2013.01); *G06T 5/003* (2013.01); *G06T 5/20* (2013.01); *G06T 5/50* (2013.01); *H04N 5/23254* (2013.01); *G06T 2207/10016* (2013.01)

(58) Field of Classification Search
CPC .. H04N 5/23267; H04N 5/23254; G06T 5/50; G06T 5/003; G06T 5/20; G06T 2207/10016
See application file for complete search history.

(56) References Cited

U.S. PATENT DOCUMENTS

| | | | |
|---|---|---|---|
| 8,509,552 B1 * | 8/2013 | Biswas | H04N 5/145 382/232 |
| 8,958,654 B1 * | 2/2015 | Evans | G06T 5/20 356/5.01 |
| 9,052,571 B1 * | 6/2015 | Lapstun | H04N 5/247 |
| 2008/0273753 A1 * | 11/2008 | Giuffrida | G01C 11/02 382/103 |
| 2010/0253811 A1 * | 10/2010 | On | H04N 5/213 348/241 |
| 2013/0016909 A1 * | 1/2013 | Mercier | G06K 9/46 382/191 |
| 2015/0248759 A1 * | 9/2015 | Lin | G06K 9/46 382/154 |

* cited by examiner

*Primary Examiner* — Jason Flohre
(74) *Attorney, Agent, or Firm* — McCarter & English LLP

(57) ABSTRACT

Methods and systems for non-stationary image sensor frame registration include receiving a data capture from an image sensor in motion, spatially filtering at least one pixel intensity value within the data capture to create a spatially filtered image, predictively differencing a filtered pixel intensity value of the spatially filtered image from a predicted intensity value, and generating a predictively differenced image based on the predictive differencing.

20 Claims, 7 Drawing Sheets

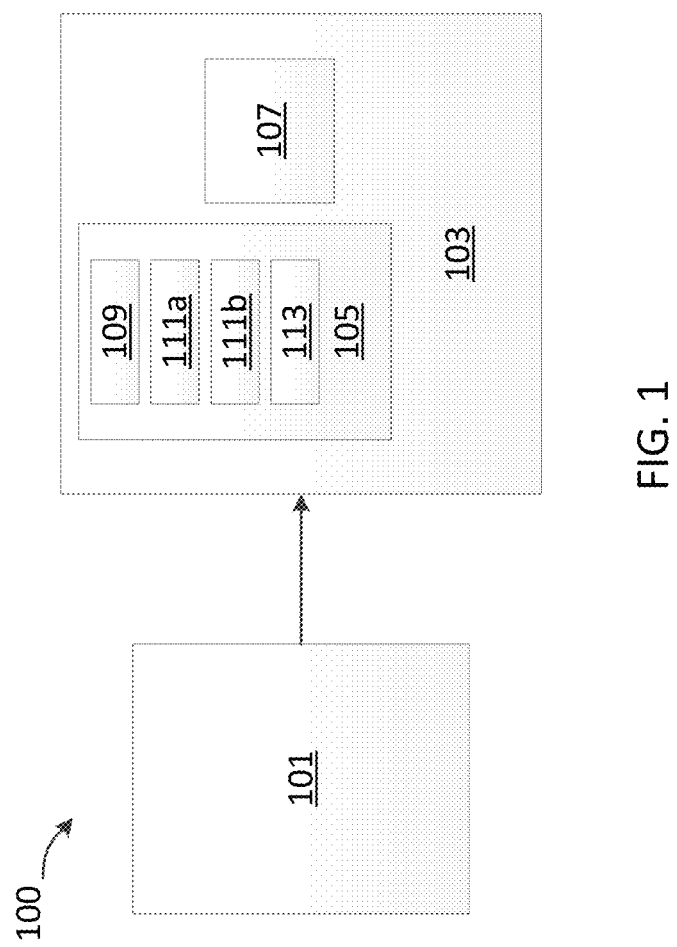

FRAME REGISTRATION FOR IMAGING SENSORS IN MOTION

RELATED APPLICATIONS

This application claims benefit of and priority to U.S. provisional application Ser. No. 62/066,400, filed Oct. 21, 2014, which is incorporated herein by reference in its entirety.

TECHNICAL FIELD

The present disclosure generally relates to image sensors, and more particularly to reducing motion-induced noise in image sensor images.

BACKGROUND

Image sensor systems often seek to compare image content between two or more data captures (frames) acquired by an image sensor. For example, such comparisons can be used to determine if any transient radiant sources are within the field of view (FOV) of the image sensor. Such transient radiant sources can, for example, include a temporary "turn on" signal such as a rocket launch, missile launch, anti-aircraft or artillery gun muzzle flash, explosions, etc. Transient radiant sources can also include rapidly moving sources such as in-flight missiles, rockets, or other ordinance. In such comparisons the image sensor system also often seeks to distinguish between a transient radiant source and a constant intensity or stationary source. In other applications, such comparisons can be used to track or detect movement of a person or other subject such as, for example, in video surveillance tracking, optical motion capture, or human computer interaction.

Conventionally, such comparisons are undertaken by image differencing. Image differencing simply subtracts the intensity data associated with a pixel in one frame from the intensity data associated with the corresponding pixel in another frame. However, while differencing is an important tool for comparing image content, it introduces a great deal of "noise" into the differenced image when used alone because it cannot account for motion, rotation, or vibration of the image sensor or host platform (e.g., an aircraft, vessel, vehicle, person, or other moving platform) over time. For example, if a constant radiation source moves through the FOV of the sensor due to motion of the sensor, the difference between pixel intensities from one frame and the next can be incorrectly or artificially high and the constant source may look like a moving object. Such incorrect differencing values can introduce unwanted errors into the frame comparison, corrupting the comparison data and any subsequent analysis.

Conventional frame registration has been used to eliminate some of the noise created by sensor motion. However, conventional frame registration techniques are highly problematic because they attempt to align frames based on readily identifiable parts of an image. This method is highly error prone because identifiable objects in an image can be difficult or impossible to locate depending on the contrast and consistency of the background image. Any failed alignment or misalignment then propagates through to subsequent frames and detections, exacerbating the problem. The difficulty in the application of this technique also increases in real time image processing systems where each frame of processing is required to take approximately the same amount of processing resources and time.

Another conventional frame registration technique applies a shifting scheme to iteratively move the frames relative to one another until a minimum difference is achieved for each pixel over a subset or the entirety of the focal plane. However, shifting methodologies are impracticable because performing the iterative shifting of each pixel requires a time-consuming draw on processing resources. Thus, this conventional technique does not deliver rapid results, especially for a size or weight limited host platform such as an aircraft or other vehicle. The difficulty in the application of this technique also increases in real time image processing systems where each frame of processing is required to take approximately the same amount of processing resources and time.

SUMMARY

In one embodiment, a method for frame registration for an imaging sensor in motion is provided. The method includes receiving, at a computing device, a data capture from an image sensor in motion. The method also includes spatially filtering, by a processing component of the computing device, at least one pixel intensity value within the data capture to create a spatially filtered image. The method also includes predictively differencing, by the processing component of the computing device, a filtered pixel intensity value of the spatially filtered image from a predicted intensity value. The predicted intensity value is a linear projection based on previous filtered pixel intensity values of a corresponding pixel in at least two previously filtered images stored in a memory component of the computing device. The method also includes generating a predictively differenced image based on the predictive differencing.

In another embodiment, a mobile imaging system is provided. The system includes an image sensor secured to a mobile host platform and configured to capture image data. The system also includes a computing device in electronic communication with the image sensor. The computing device includes a memory component and a processing component. The memory component includes instructions that, when executed by the processing component, cause the computing device to receive a data capture from the image sensor. The memory component also includes instructions that, when executed by the processing component, cause the computing device to spatially filter at least one pixel intensity value within the data capture to create a spatially filtered image. The memory component also includes instructions that, when executed by the processing component, cause the computing device to predictively difference a filtered pixel intensity value of the spatially filtered image from a predicted intensity value. The predicted intensity value is a linear projection based on previous filtered pixel intensity values of a corresponding pixel in at least two previously filtered images stored in a memory component of the computing device. The memory component also includes instructions that, when executed by the processing component, cause the computing device to generate a predictively differenced image based on the predictive differencing.

In another embodiment, a mobile imaging system is provided. The system includes a plurality of image sensors installed on a common mobile host platform, each of the image sensors configured to capture image data. The system also includes a plurality of dedicated computing devices installed on the common mobile host platform. Each of the dedicated computing devices is in electronic communication with a corresponding one of the plurality of image sensors. Each of the dedicated computing devices includes a memory component and a processing component. The memory component of each of the dedicated computing devices includes instructions that, when executed by the processing component, cause the dedicated computing device to receive a data capture from the corresponding one of the plurality of image sensors. The memory component of each of the dedicated computing devices also includes instructions that, when executed by the processing component, cause the dedicated computing device to spatially filter at least one pixel intensity value within the data capture to create a spatially filtered image. The memory component of each of the dedicated computing devices also includes instructions that, when executed by the processing component, cause the dedicated computing device to predictively difference a filtered pixel intensity value of the spatially filtered image from a predicted intensity value. The predicted intensity value is a linear projection based on previous filtered pixel intensity values of a corresponding pixel in at least two previously filtered images stored in a memory component of the dedicated computing device. The memory component of each of the dedicated computing devices also includes instructions that, when executed by the processing component, cause the dedicated computing device to generate a predictively differenced image based on the predictive differencing.

Other embodiments of the present invention will be apparent in view of the following description and claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is a block diagram showing a system for reducing motion-induced noise in image sensor images in accordance with various embodiments taught herein.

DETAILED DESCRIPTION

Figure 2A:
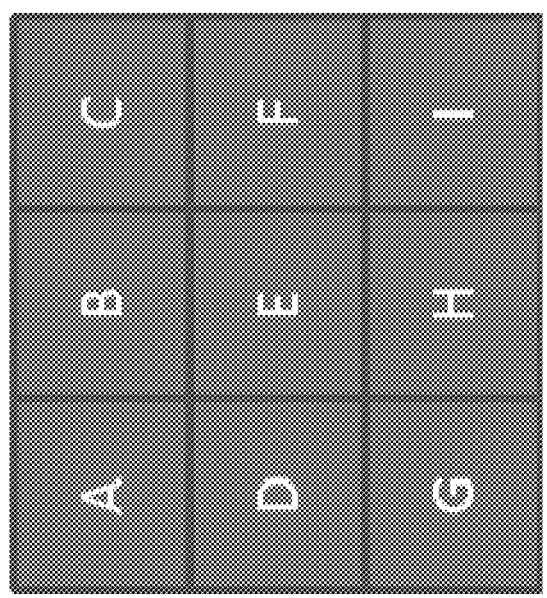
FIG. 2A is a pixel map illustrating an unfiltered data capture input acquired by an image sensor in accordance with various embodiments taught herein.

As discussed above, image sensor processing systems often seek to compare image content between two or more data captures (frames) acquired by an image sensor. For example, such comparisons can be used to determine if any transient radiant sources are within the field of view (FOV) of the image sensor. Such transient radiant sources can, for example, include a temporary "turn on" signal such as a rocket launch, missile launch, anti-aircraft or artillery gun muzzle flash, explosions, etc. Transient radiant sources can also include rapidly moving sources such as in-flight missiles, rockets, or other ordinance. In such comparisons (e.g., as part of an on-board threat warning system) the image sensor system also often seeks to distinguish between a transient radiant source and a constant intensity or stationary source (e.g., a streetlight, a smokestack, or a bonfire). In other applications, such comparisons can be used to track or detect movement of a person or other subject such as, for example, in video surveillance tracking, optical motion capture (e.g., for filmmaking, video game development, animation, sports, or medicine), or human computer interaction. Also as discussed above, conventional frame registration is highly problematic because it attempts to align frames based on readily identifiable parts of an image, which are not always distinctive or readily available. Conventional frame registration is error prone and misalignment then propagates through to subsequent frames and detections, exacerbating the problem. Also as discussed above, implementation of a shifting scheme is not practical because iterative shifting of each pixel requires a time-consuming draw on processing resources. Such techniques are simply too slow and processing-resource-intensive to deliver rapid or real-time results. Consequently, conventional techniques cause erroneous downstream results such as, in the example of a threat warning system, mistakenly identifying constant intensity sources as threats and generating a false alarm or even unwarranted countermeasure deployment.

Methods and systems are provided herein for frame registration for an image sensor in motion. The methods and systems, in accordance with various embodiments, are configured to receive, at a computing device, a data capture from an image sensor. The methods and systems are also configured to spatially filter, by a processing component of the computing device, at least one pixel intensity value within the data capture to create a spatially filtered image. The methods and systems are also configured to difference, by the processing component of the computing device, the filtered pixel intensity value of the spatially filtered image from a predicted intensity value. In accordance with various embodiments, the predicted intensity value can be a linear projection of at least two previously filtered images stored in a memory component of the computing device, to create a predictively differenced image. The methods and systems provided herein are thereby able to rapidly register and temporally difference corresponding pixels in frames captured by a moving image sensor.

Advantageously, spatially filtering a frame (data capture) causes intense, concentrated radiant energy to blur into surrounding pixels, creating a more gradual increase in detected energy, rather than the abrupt change ordinarily created by a constant radiation source (constant source). This reduction in constant source intensity difference values is further supplemented by the predictive frame differencing technique. Rather than the conventional technique of subtracting the intensity value of the current pixel from that recorded for the corresponding pixel in the previous frame, predictive frame differencing subtracts the intensity value of the current pixel from a linear prediction of what that pixel's intensity value should be in the current frame. Thus the predictive frame difference represents a change from the expected intensity rather than from the previous intensity, reducing the difference values for constant sources. Therefore, an embodiment of the present invention is able to rapidly register and difference pixel intensity values from multiple frames captured by a moving image sensor while using a minimum of processing resources.

Referring now to FIG. 1, a mobile imaging system 100 including frame registration for an image sensor in motion (i.e., a non-stationary image sensor) includes an image sensor 101 configured to capture image data in a plurality of discrete data captures (frames) over time. The system also includes a computing device 103 having a processing component 107 and a memory component 105. The computing device 103 is configured to receive a data capture (frame) from the image sensor 101 and apply, by the processing component 107, a spatial filter to one or more frames to create a spatially filtered image 109, which is stored in the memory component 105. The computing device 103 then predictively differences a filtered pixel intensity value of the spatially filtered image from a predicted intensity value. As described in greater detail below with reference to FIG. 3, the predicted intensity value can, in accordance with various embodiments, be a linear projection of at least two previously filtered images 111a-b stored in the memory component of the computing device 103 to produce a predictively differenced image 113.

Image sensor 101, in accordance with various embodiments, can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensor 101, in accordance with various embodiments can encompass any sensor configured to capture electromagnetic radiation in any spectrum for producing an image, including, for example, infrared radiation, visible light, ultraviolet radiation, x-rays, etc. In use, in accordance with various embodiments, the image sensor 101 records a plurality of data captures (frames) over time. The data associated with each frame can include spectral data (i.e., frequency of the received radiation) and intensity data (i.e., amplitude of the received radiation) for each pixel of the image sensor 101. The frame and associated data is then transmitted to or retrieved by the computing device 103.

Computing device 103, in accordance with various embodiments, can include one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable devices capable of including both processing components 107 and memory components 105, or combinations thereof. The processing component 107 of the computing system 103 can include one or more logic blocks, logic gates, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. The memory component 105 can include a computational device memory or random access memory, such as DRAM, SRAM, EDO RAM, and the like as well as, for example, flip-flops, memory blocks, RAM blocks, programmable read-only memory, any other suitable type of digital or analog memory, or combinations thereof.

In use, in accordance with various embodiments, the system 100 rapidly registers and differences the frames received by the computing device 103 from the image sensor 101 by using a spatial filter to blur the image and a predictive frame differencing technique to evaluate the difference between actual pixel intensity and expected pixel intensity for each pixel in the frame, thereby reducing the impact of constant radiant sources on temporally differenced frames. Aggregating the predictive differences for each pixel generates a predictively differenced image 113.

Figure 2B:
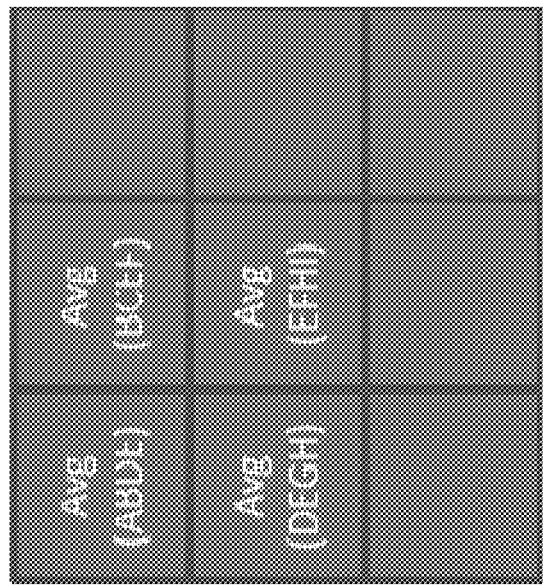
FIG. 2B is a filtered pixel map illustrating a filtered output resulting from spatial filtering of the unfiltered data capture input of FIG. 2A in accordance with various embodiments taught herein.

The spatial filter, in accordance with various embodiments, can be any spatial noise reduction filter such as, for example, a mean filter, a median filter, or a Gaussian smoothing filter technique. As illustrated in FIGS. 2A-2B, a mean filter having a 2×2 kernel is, for simplicity, applied to a 3×3 (i.e., 9 pixel) "raw" data capture (frame). However, it will be apparent in view of this disclosure that a mean filter having a kernel of any size J×K can be applied to a raw frame of any size N×M. The received raw frame as illustrated in FIG. 2A is a 3×3 frame including pixel intensity values A-I, each associated with a respective one of the 9 pixels. As illustrated in FIG. 2B, the spatial filter averages the pixel values within the 2×2 kernel and assigns the averaged value to the top left of the kernel (e.g., the average of pixel intensity values A, B, D, and E replaces pixel intensity value A of the original image). Thus, the spatial filter blurs the raw intensity values of each pixel into surrounding pixels. As further shown in FIG. 2B, because the top left of the 2×2 kernel cannot be placed over pixels in the last row and the last column (e.g., C, F, G, H, and I as shown) of the raw frame without introducing null values (e.g., placing the top left of the kernel over the pixel corresponding to pixel intensity value I of the raw frame would result in no other assigned values for the top right, bottom left, or bottom right of the kernel), the spatially filtered frame is smaller (e.g., N−1×M−1 or 2×2 as shown) than the raw frame. It will be apparent in view of this disclosure that varying sizes of kernel may result in varying size reductions of the raw frame. For example, applying a 3×3 kernel to a raw frame of size N×M and assigning the averaged value to the center pixel would result in a spatially filtered frame of size N−2×M−2.

Thus, intense, concentrated radiant energy such as the energy produced by a constant intensity source, often detected in only one or two pixels, is blurred into surrounding pixels. This blurring creates a more gradual increase in the spatially detected energy and thereby mitigates the abrupt pixel-to-pixel intensity change ordinarily created by the constant source. Thus, the amplitude of motion-induced noise associated with conventional frame differencing is reduced when differencing spatially filtered image 109 as compared to differencing raw data captures. Conversely, blurring by the mean filter has a minimal impact on intense, transient radiant sources (e.g., a missile launch, rocket launch, artillery shell muzzle flash, afterburner ignition) because such source energy is emitted in a manner that is detected over multiple pixels. Therefore, averaging pixels in the vicinity of the moving radiant source produces filtered intensity values representative of a high percentage of the source energy. Thus pixel averaging by a mean filter avoids the risk of missed threat sources due to over-blurring. Thus the spatial filter is effective at reducing constant source intensity difference values without omitting moving sources.

Figure 3:
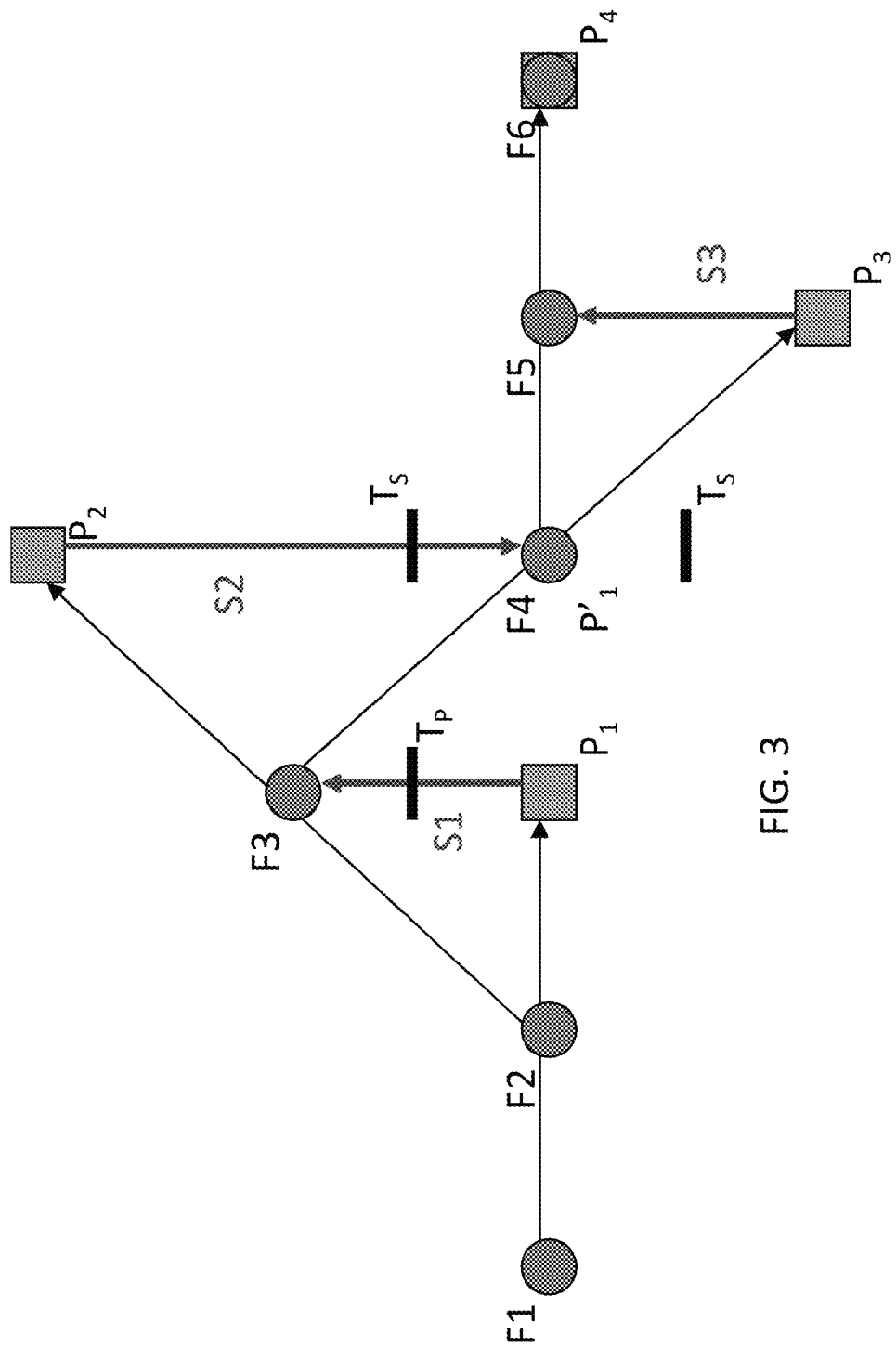
FIG. 3 is a flow chart illustrating a predictive frame differencing technique in accordance with various embodiments taught herein.

Application of a predictive frame differencing technique to the spatially filtered image 109, further reduces non-threat intensity difference values. As described above, conventional differencing techniques subtract the intensity value of the current pixel from that recorded for the corresponding pixel in a previous frame. As illustrated in FIG. 3, predictive frame differencing subtracts the current filtered pixel intensity value F3, F4, F5, F6 from a predicted pixel intensity value P1, P2, P3, P4 for the corresponding pixel. The predicted pixel intensity value P1, P2, P3, P4 is a linear prediction of what the current filtered pixel intensity value F3, F4, F5, F6 should be based on the change in a previous filtered pixel intensity value F1, F2, F3, F4, F5 of the corresponding pixel between two or more previously filtered images 111*a-b*.

The linear prediction is determined based on the difference between the filtered pixel intensity values of the two most recent previously filtered images. This is modeled as $$P_n = 2(F_{n-1}) - F_{n-2} \qquad \text{Eqn. 1}$$

where $P_n$ is the predicted pixel intensity value, $F_{n-1}$ is the immediately previous filtered pixel intensity value for the corresponding pixel, and $F_{n-2}$ is the next prior filtered pixel intensity value for the corresponding pixel. A detected signal is then determined according to a difference between the current filtered pixel intensity value and the predicted pixel intensity value. This is modeled as $$S_n = F_n - P_n \qquad \text{Eqn. 2}$$

where Sn is the detected signal, Fn is the current filtered pixel intensity value, and Pn is the predicted pixel intensity value.

FIG. 3 illustrates predictive frame differencing of filtered pixel intensity values taken over six frames with respect to a single corresponding filtered pixel. As shown, the first two filtered pixel intensity values F1 and F2 are constant. For convenience, we will refer to the pixel intensity of F1 and F2 as 1 pixel intensity unit (count). Applying Eqn. 1, P1 is determined to be P1=2(F2)−F1=1 count, thus reflecting the linear expectation that the filtered pixel intensity value will remain constant at 1 count as it did between F1 and F2. However, as shown, the third filtered pixel intensity value F3 is measured at 2 counts. Therefore, applying Eqn. 2, the first detected signal S1 is determined to be S1=F3−P1=1 count.

The second predicted intensity value P2 is determined to be P2=2(F3)−F2=3 counts because the third filtered pixel intensity value F3 increased by 1 count from the second filtered pixel intensity value F2, thus reflecting the linear expectation that the filtered pixel intensity value will continue to increase at the constant rate of 1 count as it did between F2 and F3. However, the fourth filtered pixel intensity value F4 returns to 1 count and thus the second detected signal S2 is determined to be S2=F4−P2=−2 counts.

The third predicted intensity value P3 is determined to be P3=2(F4)−F3=0 counts because the fourth filtered pixel intensity value F4 decreased by 1 count from the third filtered pixel intensity value F3, thus reflecting the linear expectation that the filtered pixel intensity value will continue to decrease at the constant rate of 1 count as it did between F3 and F4. However, the fifth filtered pixel intensity value F5 remains at 1 count and thus the third detected signal S2 is determined to be S3=F5−P3=1 count.

The fourth predicted intensity value P4 is determined to be P4=2(F5)−F4=1 count because the fifth filtered pixel intensity value F5 remained constant with the fourth filtered pixel intensity value F4, thus reflecting the linear expectation that the filtered pixel intensity value will remain constant as it did between F4 and F5. As predicted, the sixth filtered pixel intensity value F6 remains at 1 count and thus there is a null signal (i.e., no signal is detected).

Although the sixth filtered pixel intensity value F6 is shown as being a constant value with the fourth and fifth filtered pixel intensity values F4 and F5, resulting in the null signal as compared with the fourth predicted value P4, it will be apparent in view of this disclosure that any linearly increasing or decreasing signal can also produce a null signal in accordance with various embodiments. For example, if the fourth filtered pixel intensity value F4 had increased to a value of 2 counts as predicted by the second predicted value P2, the predictive difference would have been 0 counts. Thus it will be understood in view of this disclosure that the predictive frame difference represents a change from the expected intensity rather than from the previously recorded intensity, reducing the difference values for constant sources. Performing the predictive frame difference for each pixel in the image and aggregating the results produces a predictively differenced image 113.

Still referring to FIG. 3, primary thresholds $T_P$ and secondary thresholds $T_S$, in accordance with various embodiments can be used to filter noise from the detected signals S1, S2, S3. As illustrated by FIG. 3, a primary threshold $T_P$ can be set as a fixed value of signal strength and direction (e.g., +0.5 counts as shown). It will be apparent in view of this disclosure that any fixed value can be used in accordance with various conditions and can, for example, be dependent on a signal-to-noise ratio (SNR). Because S1 (1 count) exceeds the primary threshold $T_P$, the system 100 can then flag that particular pixel for subsequent analysis with regard to a secondary threshold $T_S$. As further illustrated by FIG. 3, a secondary threshold $T_S$ can be created based on the signal (S1 as shown) that exceeded the primary threshold $T_S$. The secondary threshold $T_S$ can, in accordance with various embodiments, include upper and lower filtered pixel intensity value boundaries (e.g., between 1.5 counts and 0.5 counts as shown) around a secondary first prediction value P'1 where P'1 is set at a value such that if, as illustrated by FIG. 3, the subsequent filtered pixel intensity value (F4 as shown) is within the boundaries of the secondary threshold $T_S$, the first signal S1 can be discounted as a potential threat source. However, if F4 were to exceed the boundaries of the secondary threshold $T_S$, the system 100 can identify S1 as a potential threat and commence further tracking or identification analysis.

Therefore, in accordance with various embodiments, the system 100 is able to rapidly register and difference intensity values from multiple frames captured by a moving image sensor while using a minimum of processing resources.

Figure 4:
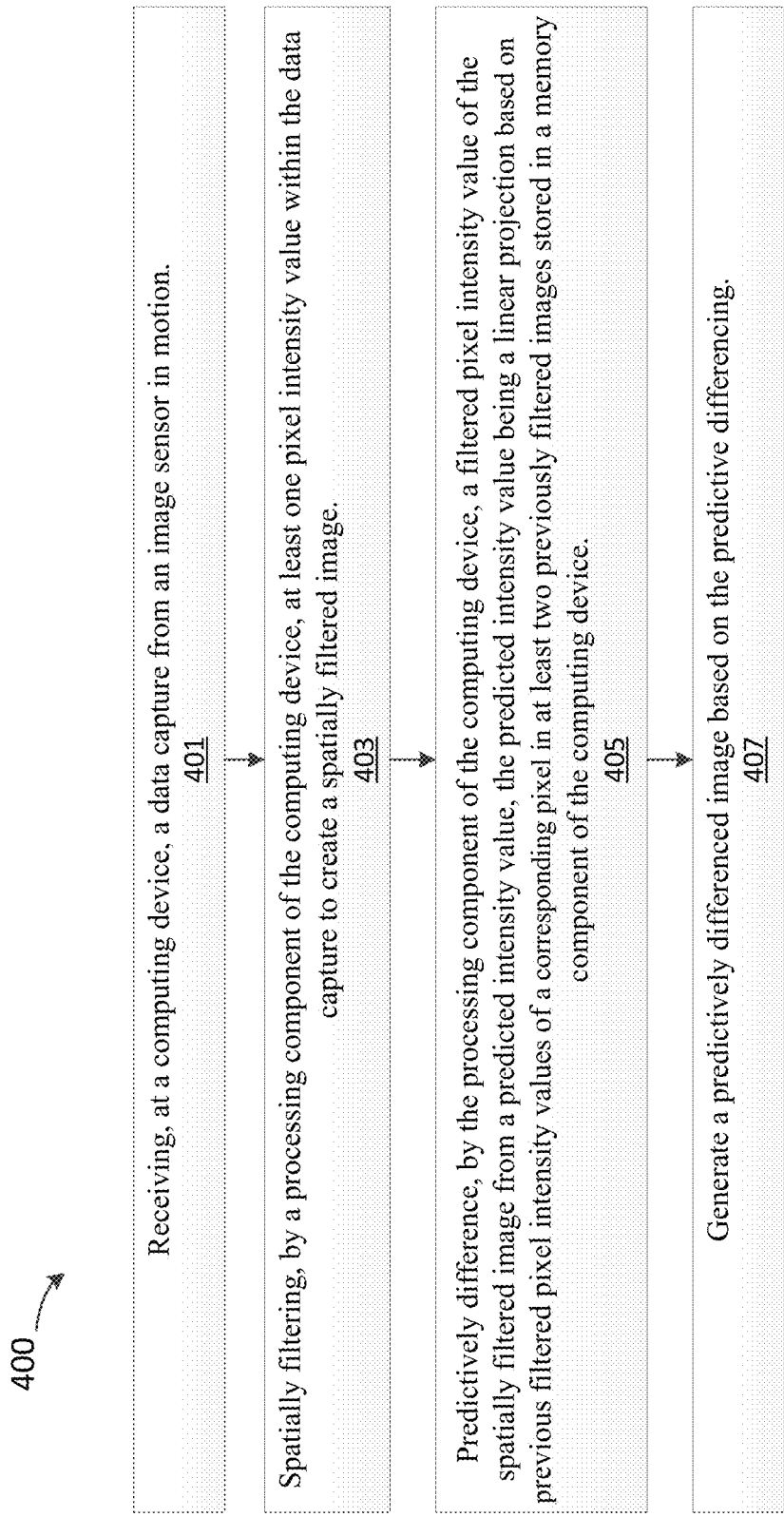
FIG. 4 is a flow chart illustrating a procedure for reducing motion-induced noise in image sensor images in accordance with various embodiments taught herein.

Referring now to FIG. 4, a method 400 is provided that is performed by embodiments of the system for frame registration for an image sensor in motion (i.e., a non-stationary image sensor). The method includes a step 401 of receiving, at a computing device, a data capture from an image sensor in motion. The method also includes a step 403 of spatially filtering, by a processing component of the computing device, at least one pixel intensity value within the data capture to create a spatially filtered image. At step 405, the method includes predictively differencing, by the processing component of the computing device, a filtered pixel intensity value of the spatially filtered image from a predicted intensity value, the predicted intensity value being a linear projection based on previous filtered pixel intensity values of a corresponding pixel in at least two previously filtered images stored in a memory component of the computing device. At step 407, the method includes generating a predictively differenced image based on the predictive differencing.

The step 401 of receiving, at a computing device, a data capture from an image sensor in motion can be performed, for example, but not limited to, using image sensor 101 and computing device 103 as described above with reference to FIG. 1.

The step 403 of spatially filtering, by a processing component of the computing device, at least one pixel intensity value within the data capture to create a spatially filtered image can be performed, for example, but not limited to, using a spatial filter and a computing device 103 having a processing component 107 and a memory component 105 to produce a spatially filtered image 109 as described above with reference to FIGS. 1 and 2.

The step 405 of predictively differencing, by the processing component of the computing device, a filtered pixel intensity value of the spatially filtered image from a predicted intensity value, the predicted intensity value being a linear projection based on previous filtered pixel intensity values of a corresponding pixel in at least two previously filtered images stored in a memory component of the computing device and the step 407 of generating a predictively differenced image based on the predictive differencing can be performed, for example, but not limited to, using a predictive frame differencing technique and a computing device 103 having a processing component 107 and a memory component 105 to predictively difference the spatially filtered image 109 based on at least two previously filtered images 111a-b to produce a predictively differenced image 113 as described above with reference to FIGS. 1 and 3.

Exemplary Distributed Imaging Systems

Figure 5:
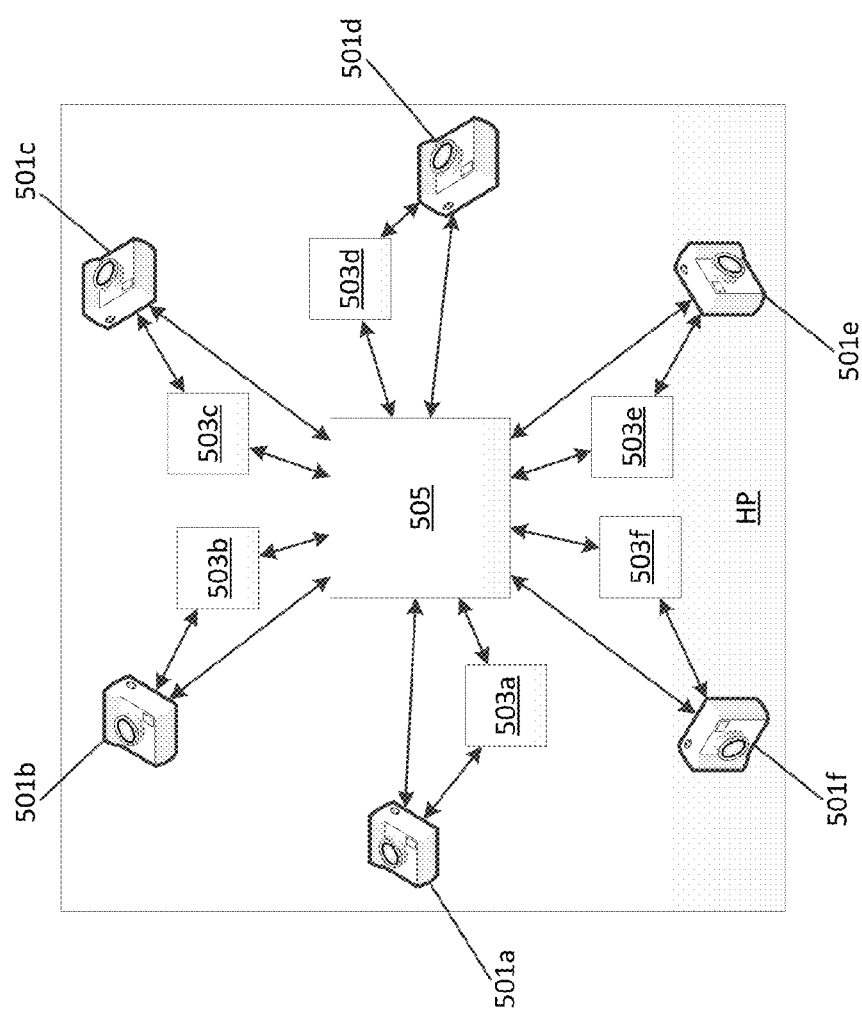
FIG. 5 is an example imaging system block diagram depicting various components which can be used to implement various embodiments in a distributed on-board imaging system in accordance with various embodiments taught herein.

FIG. 5 is an example imaging system block diagram of an exemplary distributed on-board imaging system 500. The on-board imaging system 500 can be installed on a host platform (HP). The system 500 includes a plurality of image sensors 501a-f installed on the HP, each of the image sensors 501a-f being in electronic communication with at least one of a plurality of dedicated processors 503a-f or a central processor 505 installed on the HP. As illustrated in FIG. 5, each image sensor 501a-f is in electronic communication with both the dedicated processor 503a-f and a central processor 505. However, it will be apparent in view of this disclosure that, in accordance with various embodiments, one or more of the image sensors 501a-f may communicate exclusively with the central processor 505. It will further be apparent in view of this disclosure that, in accordance with various embodiments, one or more of the image sensors 501a-f may connect exclusively with one of the dedicated processors 503a-f. It will still further be apparent in view of this disclosure that any combination of sensors per processor or processors per sensor can be used in accordance with various embodiments.

Image sensors 501a-f can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 501a-f, in accordance with various embodiments can encompass any sensor configured to capture electromagnetic radiation in any spectrum for producing an image, including, for example, infrared radiation, visible light, ultraviolet radiation, x-rays, etc.

Dedicated processors 503a-f and central processor 505 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 503a-f can be a FPGA for providing temporary storage of a limited number of data captures acquired by the corresponding image sensor 501a-f and a coarse initial analysis while the central processor 505 can be a microprocessor for conducting more detailed analysis as needed. In various embodiments, the central processor 505 can perform all processing functions, eliminating the need for dedicated processors 503a-f. In various embodiments, the dedicated processors 503a-f can perform all processing functions, eliminating the need for a central processor 505. It will be apparent in view of this disclosure that any other combinations or ratios of processors and image sensors can be used in accordance with various embodiments.

Figure 6:
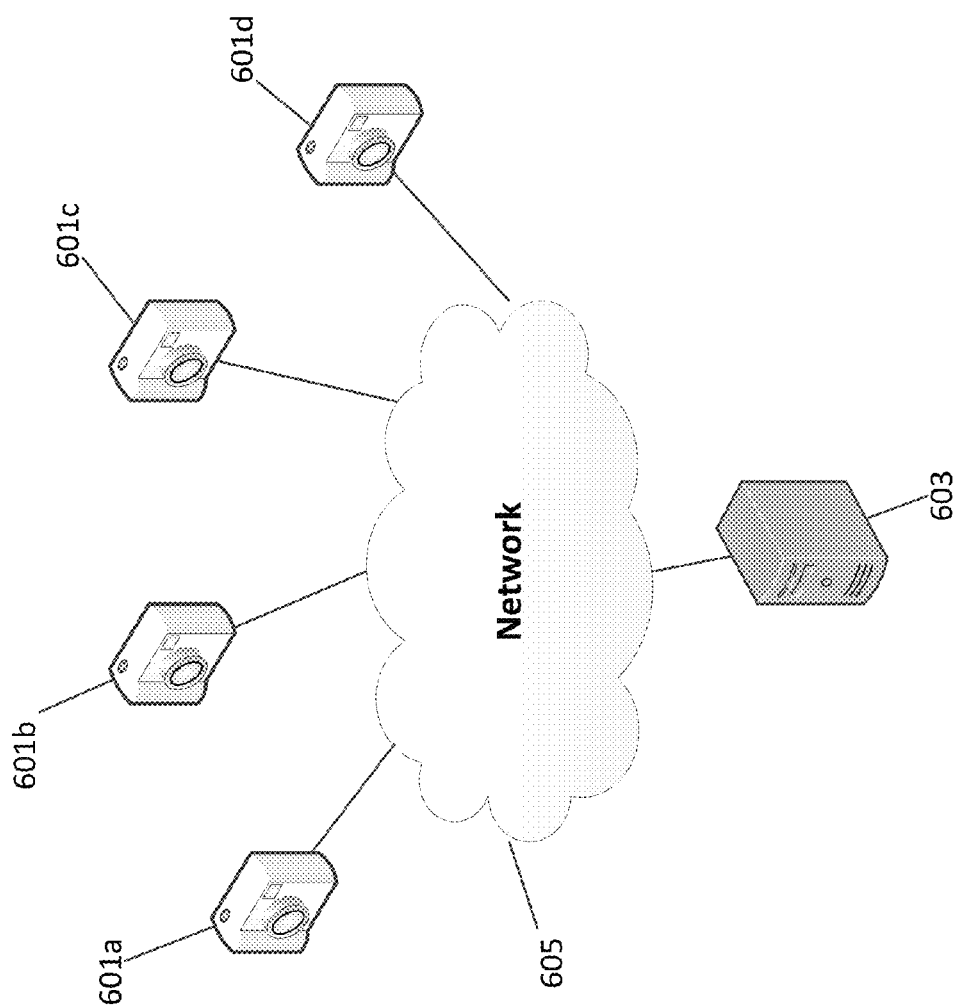
FIG. 6 is an example imaging system block diagram depicting various components which can be used to implement various embodiments in a distributed remote imaging system as taught herein.

FIG. 6 is an example imaging block diagram of certain distributed embodiments. Although FIGS. 1 and 5 and portions of the exemplary discussion above, make reference to a centralized system 100 operating with on one or more co-located image sensors and/or processors, one will recognize that various of the components and modules within the system 100 may instead be distributed across a network 605 in separately or remotely located image sensors 601a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 603 such as one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 601a-d can be received by the remote processing system(s) 603 for frame registration and comparison. In some embodiments, the remote processing system(s) 603 can provide feedback to one or more of the image sensors 601a-d based on the frame registration and comparison. In some distributed remote imaging systems, the image sensors 601a-d and processing systems 603 of the system 100 can be separately located and can be in communication with one another across the network 605.

Exemplary Computing Devices

Figure 7:
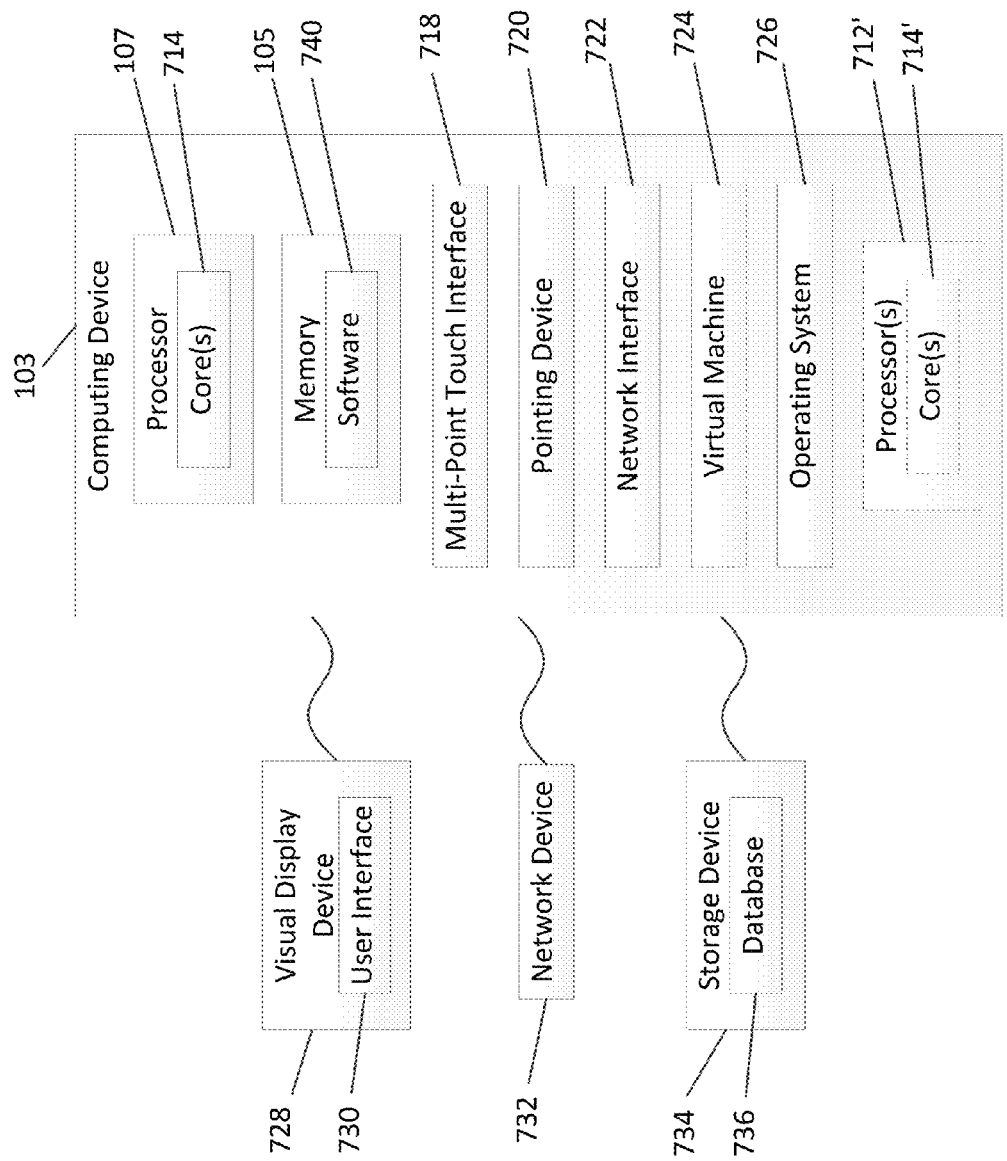
FIG. 7 is an example computational device block diagram depicting various components which can be used to implement various embodiments as taught herein.

FIG. 7 is a block diagram of the exemplary computing device 103 or portions thereof, in accordance with various embodiments and, for clarity, refers back to and provides greater detail regarding various elements of the system 100 of FIG. 1. The computing device 103 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 105 included in the computing device 103 can store computer-readable and computer-executable instructions or software for performing the operations disclosed herein. For example, the memory 105 can store a software application 740 which is configured to perform various of the disclosed operations (e.g., spatially filtering a received data capture to produce a spatially filtered image 109 then predictively differencing the spatially filtered image 109 based on at least two previously filtered images 111a-b stored in the memory component 105). The computing device 103 can also include configurable and/or programmable processor 107 and an associated core 714, and optionally, one or more additional configurable and/or programmable processing devices, e.g., processor(s) 712' and associated core(s) 714' (for example, in the case of computational devices having multiple processors/cores), for executing computer-readable and computer-executable instructions or software stored in the memory 105 and other programs for controlling system hardware. Processor 107 and processor(s) 712' can each be a single core processor or multiple core (714 and 714') processor. In some embodiments, processor 107 and processor(s) 712' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 103 so that infrastructure and resources in the computing device can be shared dynamically. A virtual machine 724 can be provided to handle a process running on multiple processors so that the process appears to be using only one computing resource rather than multiple computing resources. Multiple virtual machines can also be used with one processor.

Memory 105 can include a computational device memory or random access memory, such as DRAM, SRAM, EDO RAM, and the like. Memory 105 can also include, for example, flip-flops, memory blocks, RAM blocks, programmable read-only memory, and the like. Memory 105 can include other types of memory as well or combinations thereof.

A user can interact with the computing device 103 through a visual display device 728, such as a computer monitor, which can display one or more user interfaces 730 that can be provided in accordance with exemplary embodiments. The computing device 103 can include other I/O devices for receiving input from a user, for example, a keyboard or any suitable multi-point touch interface 718, or a pointing device 720 (e.g., a mouse). The keyboard 718 and the pointing device 720 can be coupled to the visual display device 728. The computing device 103 can include other suitable conventional I/O peripherals.

The computing device 103 can also include one or more storage devices 734, such as a hard-drive, CD-ROM, or other computer readable media, for storing data and computer-readable instructions and/or software that perform operations disclosed herein. Exemplary storage device 734 can also store one or more databases 736 for storing any suitable information required to implement exemplary embodiments. The databases 736 can be updated manually or automatically at any suitable time to add, delete, and/or update one or more items in the databases.

The computing device 103 can include a network interface 722 configured to interface via one or more network devices 732 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 722 can include a built-in network adapter, network interface card, PCMCIA network card, card bus network adapter, wireless network adapter, USB network adapter, modem or any other device suitable for interfacing the computing device 103 to any type of network capable of communication and performing the operations described herein. Moreover, the computing device 103 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 103 can run any operating system 726, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 726 can be run in native mode or emulated mode. In an exemplary embodiment, the operating system 726 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for frame registration for an image sensor in motion comprising the steps of:
   receiving, at a computing device, a data capture from an image sensor in motion;
   spatially filtering, by a processing component of the computing device, at least one pixel intensity value within the data capture to create a spatially filtered image;
   predictively differencing, by the processing component of the computing device, a filtered pixel intensity value of the spatially filtered image from a predicted intensity value, the predicted intensity value being a linear projection based on previous filtered pixel intensity values of a corresponding pixel in at least two previously filtered images stored in a memory component of the computing device; and
   generating a predictively differenced image based on the predictive differencing.

2. The method of claim 1, wherein the predictively differenced image reduces at least one intensity difference effect of at least one constant radiation source.

3. The method of claim 1, wherein the computing device is a field-programmable gate array.

4. The method of claim 1, wherein the processing component of the computing device is a microprocessor.

5. The method of claim 1, wherein the image sensor and the computing device are installed on a common mobile host platform.

6. The method of claim 5, wherein the mobile host platform is at least one of a fixed wing aircraft, a helicopter, a truck, a car, a tank, a boat, a submarine, or a ship.

7. The method of claim 1, wherein the image sensor is installed on a mobile host platform and the computing device is installed on at least one of an additional mobile host platform or a fixed host platform.

8. The method of claim 7, wherein the image sensor and the computing device are in electronic communication via a communications network.

9. The method of claim 1, wherein the spatial filter is a mean filter.

10. A mobile imaging system comprising:
    an image sensor secured to a mobile host platform and configured to capture image data; and
    a computing device in electronic communication with the image sensor and having a memory component and a processing component, the memory component including instructions that, when executed by the processing component, cause the computing device to:
    receive a data capture from the image sensor,
    spatially filter at least one pixel intensity value within the data capture to create a spatially filtered image,
    predictively difference a filtered pixel intensity value of the spatially filtered image from a predicted intensity value, the predicted intensity value being a linear projection based on previous filtered pixel intensity values of a corresponding pixel in at least two previously filtered images stored in a memory component of the computing device, and
    generate a predictively differenced image based on the predictive differencing.

11. The system of claim 10, wherein the predictively differenced image reduces at least one intensity difference effect of at least one constant radiation source.

12. The system of claim 10, wherein the computing device is a field-programmable gate array.

13. The system of claim 10, wherein the processing component of the computing device is a microprocessor.

14. The system of claim 10, wherein the computing device is installed on the mobile host platform.

15. The system of claim 10, wherein the mobile host platform is at least one of a fixed wing aircraft, a helicopter, a truck, a car, a tank, a boat, a submarine, or a ship.

16. The system of claim 10, wherein the image sensor is installed on the mobile host platform and the computing device is installed on at least one of an additional mobile host platform or a fixed host platform.

17. The system of claim 16, wherein the image sensor and the computing device are in electronic communication via a communications network.

18. The system of claim 10, wherein the spatial filter is a mean filter.

19. A mobile imaging system comprising:
    a plurality of image sensors installed on a common mobile host platform, each of the image sensors configured to capture image data;
    a plurality of dedicated computing devices installed on the common mobile host platform, each of the dedicated computing devices in electronic communication with a corresponding one of the plurality of image sensors and having a memory component and a processing component, the memory component including instructions that, when executed by the processing component, cause the dedicated computing device to:
    receive a data capture from the corresponding one of the plurality of image sensors,
    spatially filter at least one pixel intensity value within the data capture to create a spatially filtered image, and
    predictively difference a filtered pixel intensity value of the spatially filtered image from a predicted intensity value, the predicted intensity value being a linear projection based on previous filtered pixel intensity values of a corresponding pixel in at least two previously filtered images stored in a memory component of the dedicated computing device, and
    generate a predictively differenced image based on the predictive differencing.

20. The system of claim 19, further comprising a central processor installed on the common mobile host platform and in electronic communication with each of the dedicated computing devices.

* * * * *